United States Patent
Chinnakkonda Vidyapoornachary et al.

(10) Patent No.: US 10,140,186 B2
(45) Date of Patent: *Nov. 27, 2018

(54) MEMORY ERROR RECOVERY

(71) Applicant: International Business Machines Corporation, Armonk, NY (US)

(72) Inventors: Diyanesh B. Chinnakkonda Vidyapoornachary, Bangalore (IN); Marc A. Gollub, Pflugerville, TX (US); Brad W. Michael, Cedar Park, TX (US); Tony E. Sawan, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/806,404

(22) Filed: Nov. 8, 2017

(65) Prior Publication Data

US 2018/0052741 A1    Feb. 22, 2018

Related U.S. Application Data

(63) Continuation of application No. 14/929,505, filed on Nov. 2, 2015, now Pat. No. 9,940,204.

(51) Int. Cl.
| | |
|---|---|
| *G06F 11/00* | (2006.01) |
| *G06F 11/14* | (2006.01) |
| *G06F 11/07* | (2006.01) |
| *G06F 12/128* | (2016.01) |
| *G06F 12/0871* | (2016.01) |
| *G06F 12/0804* | (2016.01) |
| *G06F 12/12* | (2016.01) |

(52) U.S. Cl.
CPC ...... *G06F 11/1451* (2013.01); *G06F 11/0787* (2013.01); *G06F 11/1435* (2013.01); *G06F 12/0804* (2013.01); *G06F 12/0871* (2013.01); *G06F 12/12* (2013.01); *G06F 12/128* (2013.01); *G06F 2201/84* (2013.01); *G06F 2212/604* (2013.01); *G06F 2212/621* (2013.01); *G06F 2212/70* (2013.01)

(58) Field of Classification Search
CPC .................................................. G06F 11/145
USPC ............. 714/6.11, 6.1, 6.12, 6.13, 6.21, 6.22
See application file for complete search history.

(56) References Cited

U.S. PATENT DOCUMENTS

| | | | |
|---|---|---|---|
| 7,529,965 B2 * | 5/2009 | Ikeuchi | G06F 11/0727 714/6.2 |
| 9,940,204 B2 | 4/2018 | Vidyapoornachary et al. | |

(Continued)

OTHER PUBLICATIONS

List of IBM Patents and Patent Applications Treated as Related, Apr. 11, 2018, 2 pages.

*Primary Examiner* — Dieu Minh T Le
(74) *Attorney, Agent, or Firm* — Cantor Colburn LLP (57) ABSTRACT

An aspect includes memory error recovery in a memory system includes detecting an error condition within a memory chip of the memory system. A chip mark is applied to the memory chip to flag the error condition. An address range of the memory chip associated with the error condition is determined. Data are written from the address range of the memory chip to a cache memory. The chip mark is removed based on determining that all of the data from the address range have been written to the cache memory.

1 Claim, 5 Drawing Sheets

(56) References Cited

U.S. PATENT DOCUMENTS

| | | | |
|---|---|---|---|
| 2006/0117216 A1* | 6/2006 | Ikeuchi | G06F 11/0727 |
| | | | 714/6.2 |
| 2009/0125788 A1 | 5/2009 | Wheeler et al. | |
| 2009/0193290 A1* | 7/2009 | Arimilli | G06F 12/0802 |
| | | | 714/6.32 |
| 2014/0089725 A1* | 3/2014 | Ackaret | G06F 12/0653 |
| | | | 714/6.1 |
| 2014/0157044 A1 | 6/2014 | Dell et al. | |
| 2015/0363255 A1 | 12/2015 | Dell et al. | |

* cited by examiner

MEMORY ERROR RECOVERY

PRIORITY

This application is a continuation of and claims priority from U.S. patent application Ser. No. 14/929,505 filed on Nov. 2, 2015, the entire contents of which are incorporated herein by reference.

BACKGROUND

The present invention relates to computer memory, and more specifically, to memory error recovery in a computer system.

In some applications, writing to memory in a computer system includes writing to one of multiple memory devices. For example, memory in a server is comprised of a number of memory devices such as dynamic random-access memory (DRAM) chips. Writing data to memory of the server typically involves writing to multiple DRAM chips. To ensure that data are correctly written and retrieved, error-correcting code (ECC) bits are generally written along with the data so that the ECC bits may be verified in the read data. The ECC bits are included with stored data through an encoding process and are verified in read data through a decoding process. Processing of the ECC bits by a decoder may lead to the inclusion of a chip mark. The chip mark identifies one of the DRAMs and indicates that all data from that DRAM must be corrected. Processing of the ECC bits may also lead to the inclusion of a symbol mark. A symbol is a subset of the addresses of one DRAM. The number of addresses in a range defined as a symbol may differ based on the memory device. Thus, the symbol mark identifies that data from a subset of addresses of one of the DRAMs must be corrected. The use of a symbol mark or chip mark for a soft error (e.g., a temporary error) locks up the availability of the marking feature such that marks are unavailable for a hard error (e.g., a persistent error).

SUMMARY

According to one embodiment, a method of memory error recovery in a memory system includes detecting an error condition within a memory chip of the memory system. A chip mark is applied to the memory chip to flag the error condition. An address range of the memory chip associated with the error condition is determined. Data are written from the address range of the memory chip to a cache memory. The chip mark is removed based on determining that all of the data from the address range have been written to the cache memory.

According to another embodiment, a system for memory error recovery includes a plurality of memory chips configured to store data at memory addresses and a memory error recovery controller. The memory error recovery controller is configured to detect an error condition within one of the memory chips as an errant memory chip and apply a chip mark to the errant memory chip to flag the error condition. An address range of the memory chip associated with the error condition is determined. Data are written from the address range of the memory chip to a cache memory. The chip mark is removed based on determining that all of the data from the address range have been written to the cache memory.

According to yet another embodiment, a computer program product for memory error recovery includes a computer readable storage medium having program instructions embodied therewith. The program instructions are executable by a processor to cause the processor to detect an error condition within a memory chip of the memory system. A chip mark is applied to the memory chip to flag the error condition. An address range of the memory chip associated with the error condition is determined. Data are written from the address range of the memory chip to a cache memory. The chip mark is removed based on determining that all of the data from the address range have been written to the cache memory.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments described herein are directed to memory error recovery in a memory system. A portion of cache memory is used to mitigate memory device hardware faults, where selected cache locations are used to replace locations in memory experiencing an error condition. An address range of the cache memory can be configured to limit a number of locations assigned for memory error recovery. In one embodiment, during a system boot process, a cache controller establishes a number of cache locations for memory error recovery (e.g., a number N), while the remaining locations in the cache are used according to default cache memory performance.

As noted, ECC bits are included with stored data to verify the data when it is retrieved from one or more memory chips, such as DRAMs. ECC bits can also be used to reconstruct a correct data value when an errant data value is detected. Processing or decoding of the ECC bits in data read from a DRAM may result in a chip mark that marks one DRAM as defective and indicates that data retrieved from that DRAM must be corrected. However, the use of a chip mark is at a cost of diminished error detection and correction following the chip mark. Embodiments of the systems and methods detailed herein relate to determining whether a range of failed addresses can be relocated from an errant memory chip to cache memory, where the cached version of data from the errant memory chip is retained in a reserved portion of the cache memory such that it is not prematurely evicted back to the errant memory chip. If the entire address range of the memory chip associated with an error condition is written to the cache memory, a chip mark associated with the errant memory chip can be removed, such that the ability to apply a chip mark to another memory chip is retained to tolerate a subsequent fault.

Figure 1:
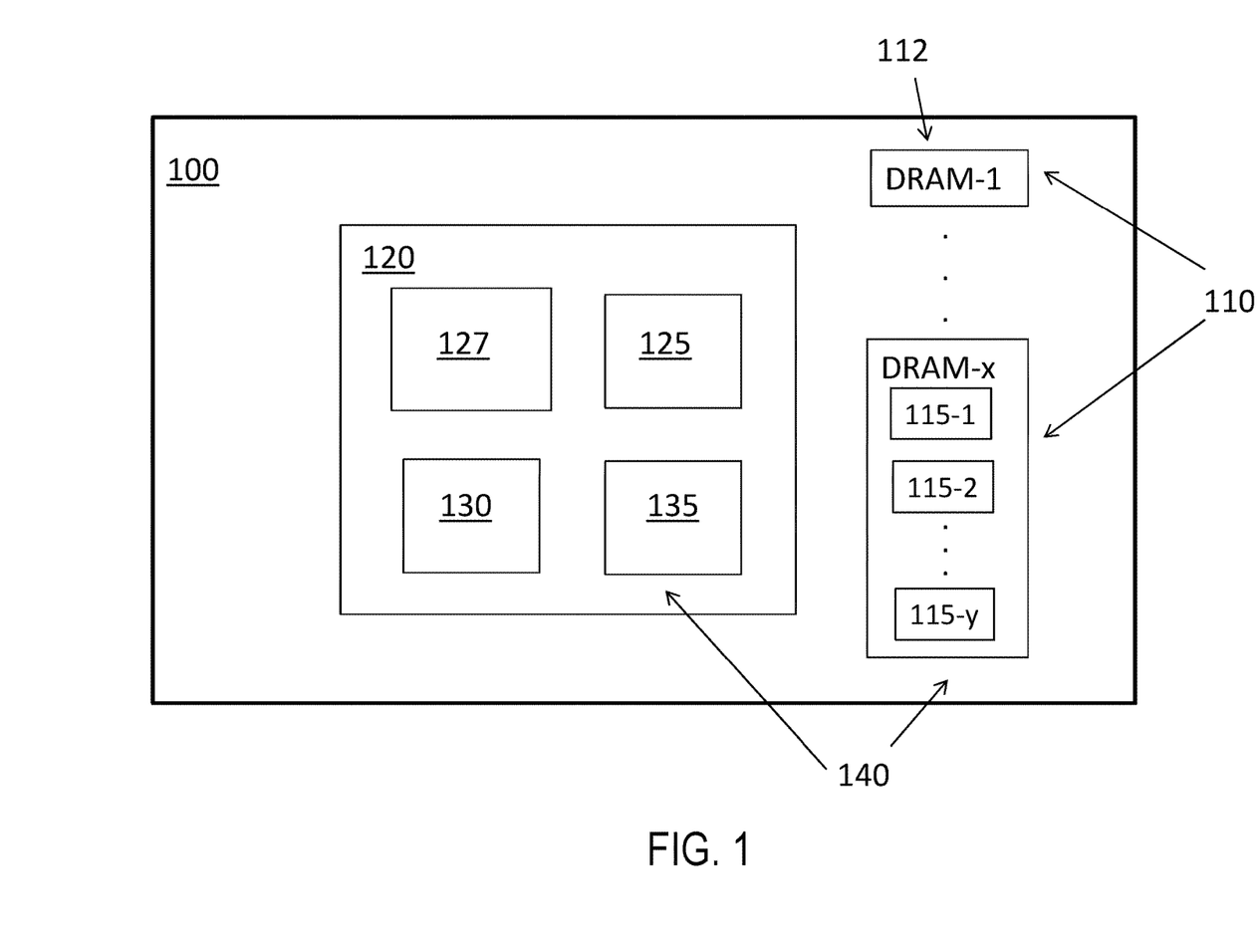
FIG. 1 is a block diagram of an exemplary system in which multiple DRAMs are accessed according to embodiments of the invention.

FIG. 1 is a block diagram of an exemplary system 100 in which multiple memory chips 110 (e.g., DRAM devices) are accessed according to embodiments of the invention. The memory chips 110 may be part of main memory 112 of the system 100. Each memory chip 110 may include a number of banks 115. A bank 115 is a subset of the rank or address range of the entire memory chip 110. The system 100 may be a server or other computer system, for example. The components and activities of the processing portion 120 of the system 100 that are discussed herein relate specifically to memory management. The processing portion 120 or processing circuit includes hardware, firmware, and software to implement the functions discussed herein. The processing portion 120 of the system 100 may include many other components and activities directed to other functions of the system 100. In the example of FIG. 1, the processing portion 120 includes a memory controller 125 that manages access to the memory chips 110 and a scrub engine 127 that identifies and attempts to fix errors in memory. The processing portion 120 can also include a cache controller 130 and cache memory 135. The cache memory 135 may be a portion of L4 cache in a cache hierarchy, where other levels of cache (e.g., L1, L2, L3, etc. are not depicted). Collectively, the main memory 112 and cache memory 135 are part of a memory system 140. The processing portion 120 (hardware, firmware, software) pertinent to memory management may be referred to as a memory error recovery controller. The processing portion 120 can be embodied in one or more processors. Alternatively, the processing portion 120 can be distributed in multiple devices, such as one or more processors and one or more memory hub devices.

Figure 2:
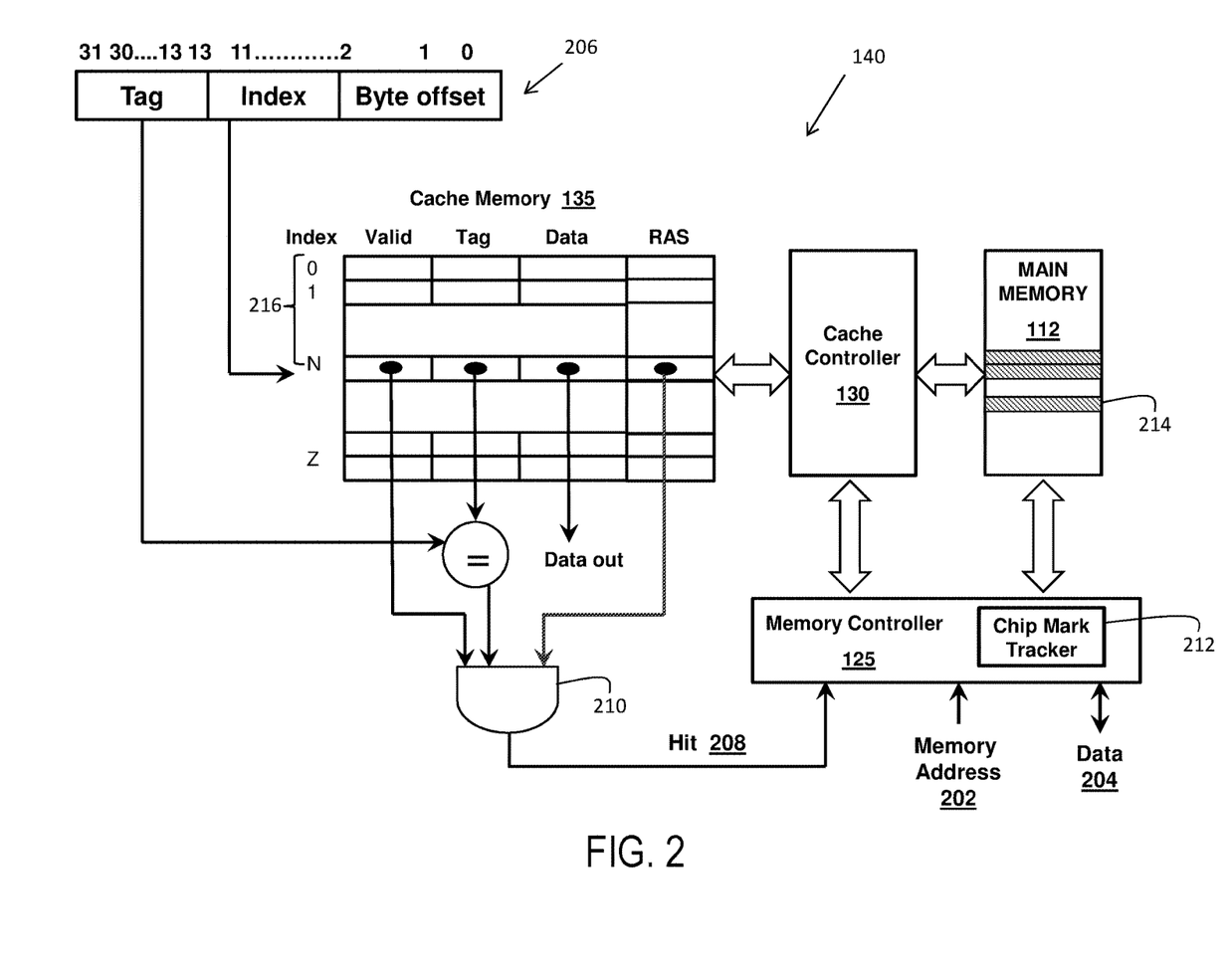
FIG. 2 is a block diagram illustrating interactions between a memory controller, cache controller, cache memory, and main memory according to an embodiment of the invention.

FIG. 2 is a block diagram illustrating interactions between memory controller 125, cache controller 130, cache memory 135, and main memory 112 in memory system 140 according to an embodiment of the invention. The memory controller 125 can receive a memory address 202 to read data 204 or store data 204 with respect to main memory 112. The memory controller 125 can interface with cache controller 130 to determine whether data from a desired address is stored in cache memory 135. For instance, the memory address 202 can be used access the cache memory 135 through a cache address format 206 defining a tag, index, and byte offset with respect to entries in cache memory 135. Each entry in the cache memory 135 may include entries that can be indexed and include validity flags, tags, data, and a RAS (reliability/availability/serviceability) tag to locate a hit 208 through an AND-gate function 210 and read a data output.

The scrub engine 127 of FIG. 1 can detect an error condition within one of the memory chips 110 of FIG. 1 in the memory system 140. Memory scrubbing entails reading from each memory location, correcting bit errors based on the error-correcting code that is embedded in the data, and writing back corrected data. This process requires redundancy in the stored data in order to facilitate correction of bit errors in the data. A chip mark tracker 212 can track and process error conditions detected by the scrub engine 127 of FIG. 1 at memory locations 214 forming an address range associated with an error condition. The chip mark tracker 212 may distinguish between soft errors and hard errors among the failures detected by scrubbing. Distinguishing between soft errors and hard errors may take a period of time as an incorrect bit must be corrected and then found to be incorrect again to ascertain if the error is persistent (thereby indicating a hard error). When it is determined that there are hard errors, steps can be taken to write data from the address range of the faulty locations into a reserved portion 216 of cache memory 135 provided that a sufficient capacity is available. The processing is further described with respect to FIGS. 3-5.

Figure 3:
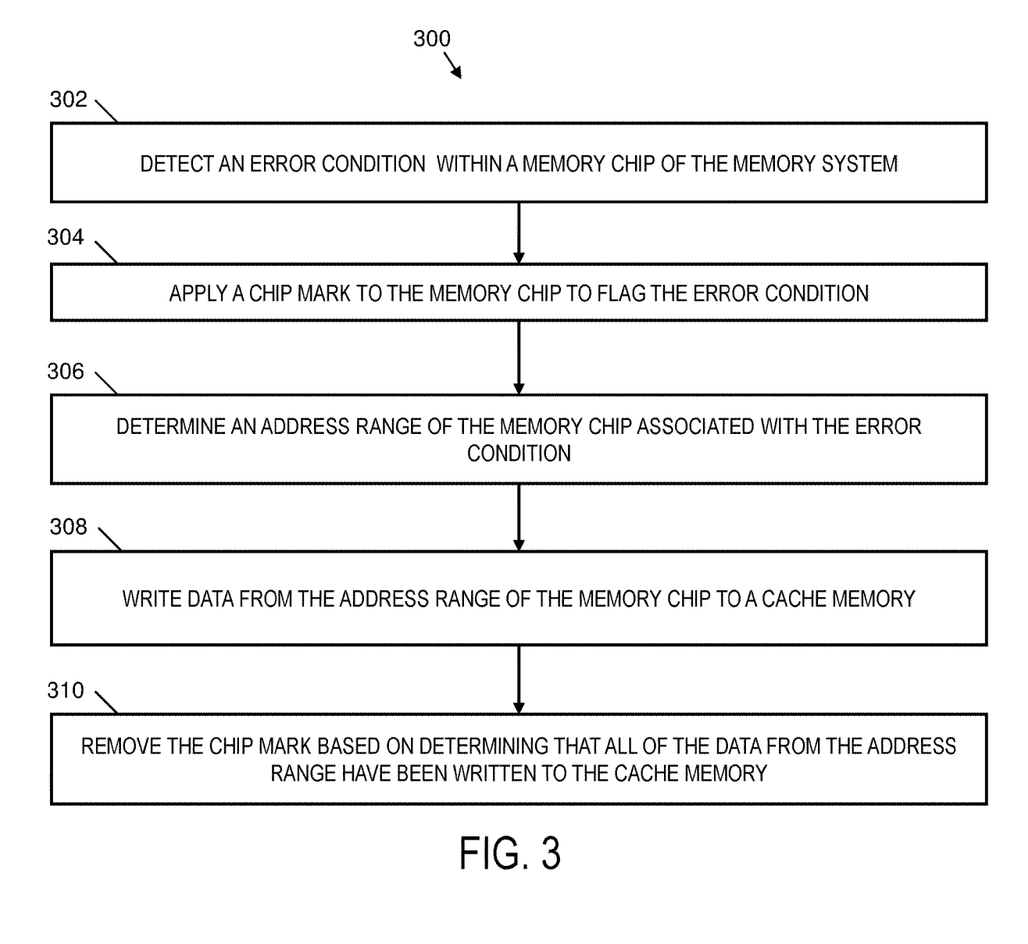
FIG. 3 is a process flow of a method of memory error recovery according to an embodiment of the invention.

FIG. 3 is a process flow of a method 300 of memory error recovery according to an embodiment. The method 300 can be performed by various elements of the processing portion 120 of FIG. 1 and is described in reference to FIGS. 1 and 2. Although a particular order of blocks is depicted and described with respect to FIG. 3, it will be understood that the order can be changed, and the blocks may be combined or further subdivided.

At block 302, the processing portion 120 detects an error condition within a memory chip 110 of the memory system 140. The scrub engine 127 can perform error detection as a background process by stepping through a range of addresses in the memory chip 110 to identify an error, such as a stuck bit and/or failed ECC result.

At block 304, the processing portion 120 applies a chip mark to the memory chip 110 to flag the error condition. Chip marks may be reserved for hard error conditions where an attempted correction action to re-write a failed memory location using ECC is unsuccessful.

At block 306, the processing portion 120 determines an address range of the memory chip 110 associated with the error condition. For example, the chip mark tracker 212 can determine a number of error conditions identified by the scrub engine 127 in a bank 115 or in a memory chip 110 across a range of addresses. The processing portion 120 can determine a number of locations in the cache memory 135 allocated for storing data from the errant memory chip. The number of locations in the cache memory 135 allocated for storing data from the errant memory chip can be configurable. For example, a configurable value 'N' may be established during a boot operation of the system 100 to allocate less than all of the cache memory 135 for memory error recovery. The cache controller 130 can cast out data from the cache memory 135 to accommodate writing of data from the address range of the memory chip 110 to the cache memory 135. The memory controller 125 can direct the cache controller 130 to configure the cache memory 135 for use in holding data from the address range of the memory chip 110 by marking tag bits (e.g., RAS tags) of the cache memory 135.

At block 308, the processing portion 120 writes data from the address range of the memory chip 110 to the cache memory 135. Writing of data from the address range of the errant memory chip to the cache memory 135 may be based on determining that the address range is less than or equal to the number of locations (e.g., 'N') in the cache memory 135 allocated for storing data from the errant memory chip, e.g., reserved portion 216. Writing of data from the address range of the memory chip 110 to the cache memory 135 can also be based on determining that the error condition is a hard failure. The memory controller 125 may correct data errors prior to writing data from the address range of the memory chip 110 to the cache memory 135, e.g., using ECC.

At block 310, the processing portion 120 removes the chip mark based on determining that all of the data from the address range have been written to the cache memory 135. The chip mark is left in place based on determining that the address range is greater than to the number of locations available in the reserved portion 216 of the cache memory 135 allocated for storing data from the errant memory chip. In other words, if there is insufficient capacity to transfer all of the data at failed address locations into the cache memory 135, the chip mark must remain in place. If a chip mark can be removed, the system 100 retains the capability to apply a chip mark for another memory chip 110 on a subsequent failure.

Figure 4:
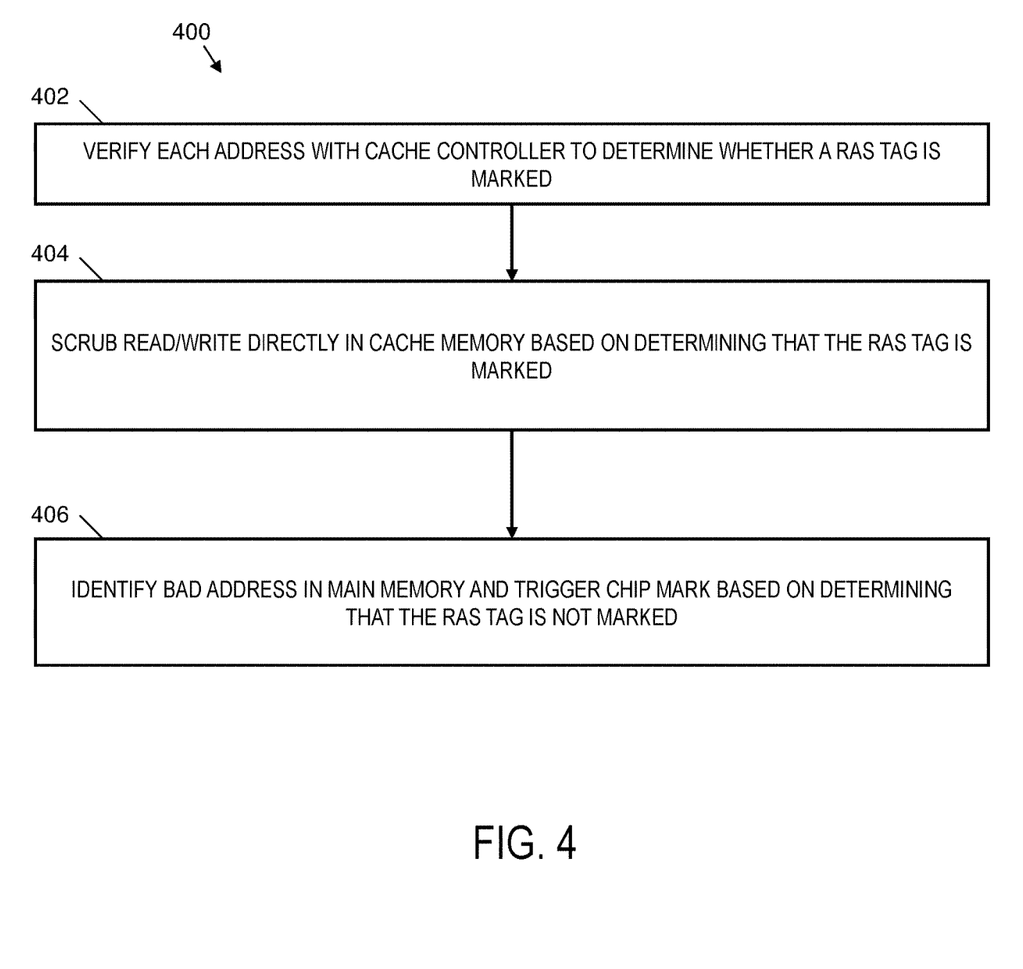
FIG. 4 is a process flow of a method of chip mark management according to an embodiment of the invention.

FIG. 4 is a process flow of a method 400 of chip mark management according to the embodiment. The method 400 provides one approach to avoid rediscovering bad addresses and retriggering a chip mark when the scrub engine 127 of FIG. 1 is used. The method 400 can be performed by various elements of the processing portion 120 of FIG. 1 and is described in reference to FIGS. 1 and 2. Although a particular order of blocks is depicted and described with respect to FIG. 4, it will be understood that the order can be changed, and the blocks may be combined or further subdivided.

At block 402, the processing portion 120 verifies each address with cache controller 130 to determine whether a RAS tag is marked in the cache memory 135. At block 404, the scrub engine 127 performs read/write scrub operations directly in cache memory 135 based on determining that the RAS tag is marked. At block 406, the scrub engine 127 identifies a bad address in main memory 112 and triggers a chip mark based on determining that the RAS tag is not marked. Thus, known errant memory locations in main memory 112 that have been written to the cache memory 135 are not repeatedly rediscovered.

Figure 5:
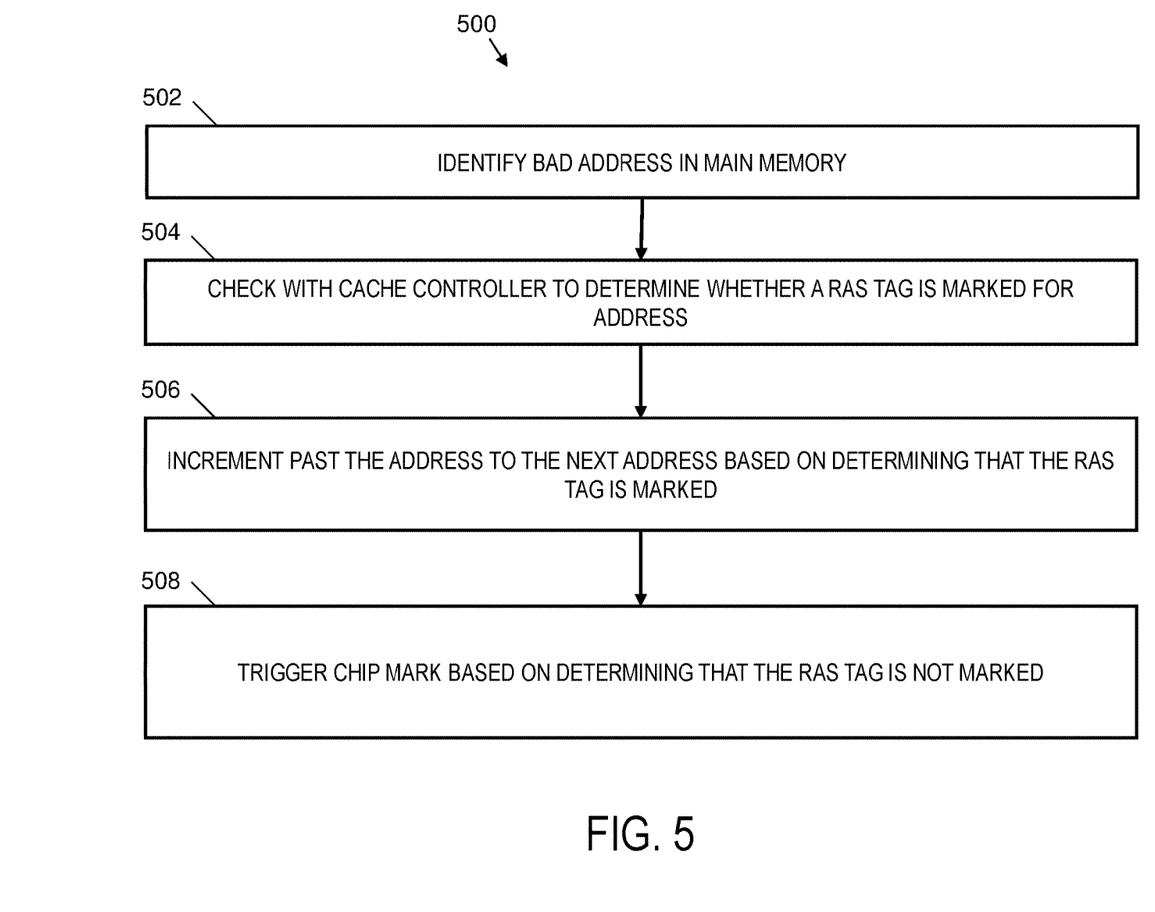
FIG. 5 is a process flow of another method of chip mark management according to an embodiment of the invention.

FIG. 5 is a process flow of another method 500 of chip mark management according to the embodiment. The method 500 provides another approach to avoid rediscovering bad addresses and retriggering a chip mark when the scrub engine 127 of FIG. 1 is used. The method 500 can be performed by various elements of the processing portion 120 of FIG. 1 and is described in reference to FIGS. 1 and 2. Although a particular order of blocks is depicted and described with respect to FIG. 5, it will be understood that the order can be changed, and the blocks may be combined or further subdivided.

At block 502, the scrub engine 127 identifies a bad address in main memory 112. At block 504, the processing portion 120 checks with cache controller 130 to determine whether a RAS tag is marked for address. At block 506, the scrub engine 127 increments past the address to the next address based on determining that the RAS tag is marked. At block 508, the scrub engine 127 triggers a chip mark based on determining that the RAS tag is not marked. Thus, errant memory locations in main memory 112 that have been written to the cache memory 135 are not repeatedly rediscovered.

Technical effects and benefits include memory error recovery in a memory system by utilizing a portion of cache memory to buffer failed memory locations and free error marking resources for use in subsequent error conditions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of memory error recovery in a memory system, the method comprising:
   detecting a plurality of error conditions within a memory chip of the memory system by a scrub engine in a processing portion comprising one or more processors that reads a plurality of locations within the memory chip, the error conditions comprising one or more stuck bits at two or more of the locations;
   applying a chip mark to the memory chip to flag the error conditions by a chip mark tracker in the processing portion;
   determining an address range of the memory chip associated with the error conditions by the chip mark tracker;
   directing a cache controller to configure a cache memory for use in holding data from the address range of the memory chip by marking a plurality of tag bits of the cache memory;
   determining a number of locations in the cache memory allocated for storing data from an errant memory chip, wherein the number of locations in the cache memory allocated for storing data from the errant memory chip is configurable;
   casting out data from the cache memory to accommodate writing of data from the address range of the memory chip to the cache memory;
   writing data from the address range of the memory chip to the cache memory based on determining that the address range is less than or equal to the number of locations in the cache memory allocated for storing data from the errant memory chip and determining that at least one of the error conditions comprises the one or more stuck bits; and
   removing the chip mark based on determining that all of the data from the address range have been written to the cache memory.

* * * * *